United States Patent Office 2,969,279
Patented Jan. 24, 1961

2,969,279

PROCESS OF DECOMPOSING AND STABILIZING REFUSE

Norman A. Pierson, Norman, Okla., assignor to Naturizer Co., Norman, Okla., a corporation of Oklahoma Filed Aug. 1, 1956, Ser. No. 601,423

4 Claims. (Cl. 71—9)

This invention relates to improvements in the art of composting waste materials, such as refuse, and more particularly, to an improved method of producing a stabilized, substantially composted product suitable for use as a soil nutrient.

In this specification and the appended claims, the term "refuse" shall mean all of the waste materials collected by a municipal sanitary or garbage collection system, including both organic and inorganic materials, such as glass, rags, paper, cardboard, table-scraps, tree limbs, leaves and a great variety of other waste products disposed of by the normal household. Refuse may be contrasted with "garbage," which is only table-scraps and other waste food products and normally having a moisture content of about 70–95 percent; whereas refuse has a moisture content which ordinarily varies between 10 and 55 percent. Refuse does, of course, contain what is normally considered to be garbage. "Sludge" is the final solid or semi-solid product obtained from a sewage disposal digestion system which is sometimes dried and used as a fertilizer.

Many attempts have been made to provide a satisfactory process for composting both garbage and refuse on a commercial scale. However all previously known methods, and particularly methods of composting refuse, have either required complicated and expensive machinery, or an unacceptable amount of obnoxious gases are given off during the composting operation.

Perhaps the earliest attempt to compost refuse was by a completely anaerobic process. Anaerobic bacterial digestion will produce a satisfactory soil nutrient, and is in use in many foreign countries on a small scale. However, the anaerobic bacteria give off obnoxious gases in abundant quantities, and no means have apparently been found to efficiently control or deodorize the discharging gas. Several attempts have also been made to provide an aerobic bacterial digestion of refuse and garbage, and particularly garbage, to overcome the distasteful exhaust of obnoxious gases through anaerobic action. These processes have invariably required complicated digestion cells to completely eliminate anaerobic activity. Usually, the digestion cells are provided with conveyers or scrapers to continuously move the composting mass during the digestion cycle to assure contact of the mass by air. It is also known to comminute, or at least shred, an initial material prior to aerobic digestion. However, to the best of applicant's knowledge, grinding has been effectively used only in processes of composting garbage, and merely adds to the problem of providing a complete aeration of the composting mass to attain aerobic digestion.

A process involving a combination anaerobic and aerobic digestion is disclosed in applicant's co-pending application, entitled "Process of Municipal Refuse Disposal," Ser. No. 453,669, filed September 1, 1954, now Patent No. 2,823,106. Such a process produces a quite satisfactory composted product, but the anaerobic portion of the process produces a perceptible amount of objectionable gases, and the complete process frequently requires a total of 30 days to produce a completely composted material. Also, in this prior combination type process, the length of time required to complete the composting operation is more dependent on climatic conditions than is the present process.

The present invention contemplates a completely aerobic process of composting municipal refuse, as well as other waste products, such as sewage sludge and cotton seed hulls, with a minimum of apparatus and a minimum amount of separation being required to remove non-compostable portions of the initial refuse. In preparing the refuse for bacterial and fungi digestion, I prefer to moisten and reduce the particle size of the refuse, whereby the peak temperature of the refuse, during subsequent digestion, will be attained in a minimum of time. This invention also contemplates the elimination of anaerobic bacterial action, with the accompanying odors, by controlling the initial digestion cycle. After the peak digestion temperature is reached, the refuse is preferably again reduced in particle size to expose a still greater surface area to bacterial and fungi action, and then the refuse is exposed to uncontrolled bacterial and fungi action until substantially stabilized. The uncontrolled digestion cycle is obtained in a most economical and efficient manner by simply stacking the material in piles or wind-rows.

An important object of this invention is to provide an economical process of producing a stabilized compost-like product.

Another object of this invention is to provide a process of stabilizing refuse, as contrasted with the composting of garbage only.

Another object of this invention is to provide an economical process of stabilizing refuse without the production of obnoxious gases.

A further object of this invention is to provide a process of composting refuse, wherein sludge may be incorporated with the refuse without the production of objectionable gases.

Another object of this invention is to provide a substantially completely aerobic composting process requiring a minimum of man-power.

A still further object of this invention is to provide a process of composting refuse which is more efficient than prior known processes.

Other objects and advantages of the invention will be evident from the following detailed description, when read in conjunction with the accompanying drawings which illustrate my invention.

Broadly stated, the present invention may be defined as a method of decomposing a mass of waste material which includes a substantial proportion of refuse, comprising the steps of grinding the mass, subjecting the ground mass to controlled aerobic digestion to minimize anaerobic bacterial activity until the temperature exceeds the temperature at which anaerobic bacteria normally survive, re-grinding the partially composted mass, and then subjecting the mass to uncontrolled bacterial action until the temperature proceeds beyond its peak.

Figure 1:
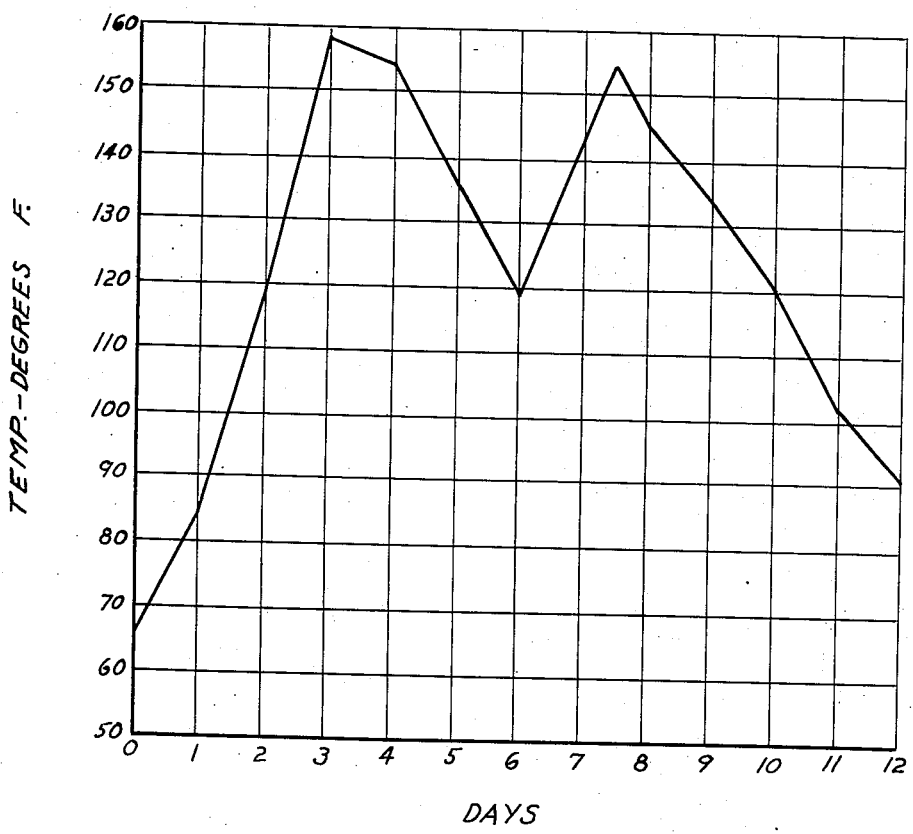
Figure 1 is a typical temperature curve obtained by decomposing refuse in accordance with this invention.

One of the basic discoveries leading to this invention is the temperature cycle occurring in a mass of refuse or the like exposed to fungi and aerobic bacterial action, and particularly during the initial decomposition stages of the digestion. I have found that the temperature of refuse will increase rather rapidly to a peak as shown in Fig. 1, and then gradually decrease when the exposed surface of the refuse is not increased during the digestion cycle. This peak temperature is above the temperature at which anaerobic bacteria will normally survive (120 to 144 degrees F.), as well as above the temperature of pasteurization (141 degrees F.). Therefore, substantially all of the anaerobic bacteria, which are always present in raw refuse, may be killed if the entire quantity of refuse being digested is allowed to attain this peak temperature.

After the refuse has gone beyond the peak temperature, the refuse will contain thermophilic, aerobic bacteria which will again become active upon a further exposure of the surface area of the refuse, or upon an increase in moisture. I have discovered, however, that when the temperature of the refuse is increased to a peak a second time, the resulting material may be stabilized against further substantial bacterial activity, by drying the material to an optimum moisture content. This stabilized material has a satisfying amount of minerals which facilitate the growth of plant life.

Another basic discovery leading to this invention is the desirability of certain fungi growth in material being composted. I have found that when refuse is inoculated with *A. fumigatus* type mold or fungus, the fungus grows throughout the composting mass and, particularly when combined with bacterial action, converts the refuse to a sweet-smelling soil nutrient. The growth of this fungus may be greatly accelerated by breaking-up and mixing the composting mass at intervals of about one day, particularly during the early composting stages, to distribute the fungus through the mass. Although I do not wish to be limited to any particular theory, it appears that when the fungus is permitted to grow undisturbed for a period of about 24 hours, it can then be broken-up and at least two new cells or plants will survive for each initial cell or plant.

Generally speaking, the present invention is directed to the shortening of the time required to eliminate the anaerobic bacteria, with the minimum of apparatus and without the release of offensive odors, as well as to the complete preparation of a stabilized soil nutrient.

As previously indicated the moisture content of the usual municipal refuse varies from 18 to 25 percent. Other facts of interest are that the carbon/nitrogen ratio of the initial refuse varies from 20/1 to 80/1 and the refuse ordinarily weighs from 11 to 20 pounds per cubic foot. Also, as previously indicated, the refuse comprises a great variety of different materials, including a varying amount of garbage.

Figure 2:
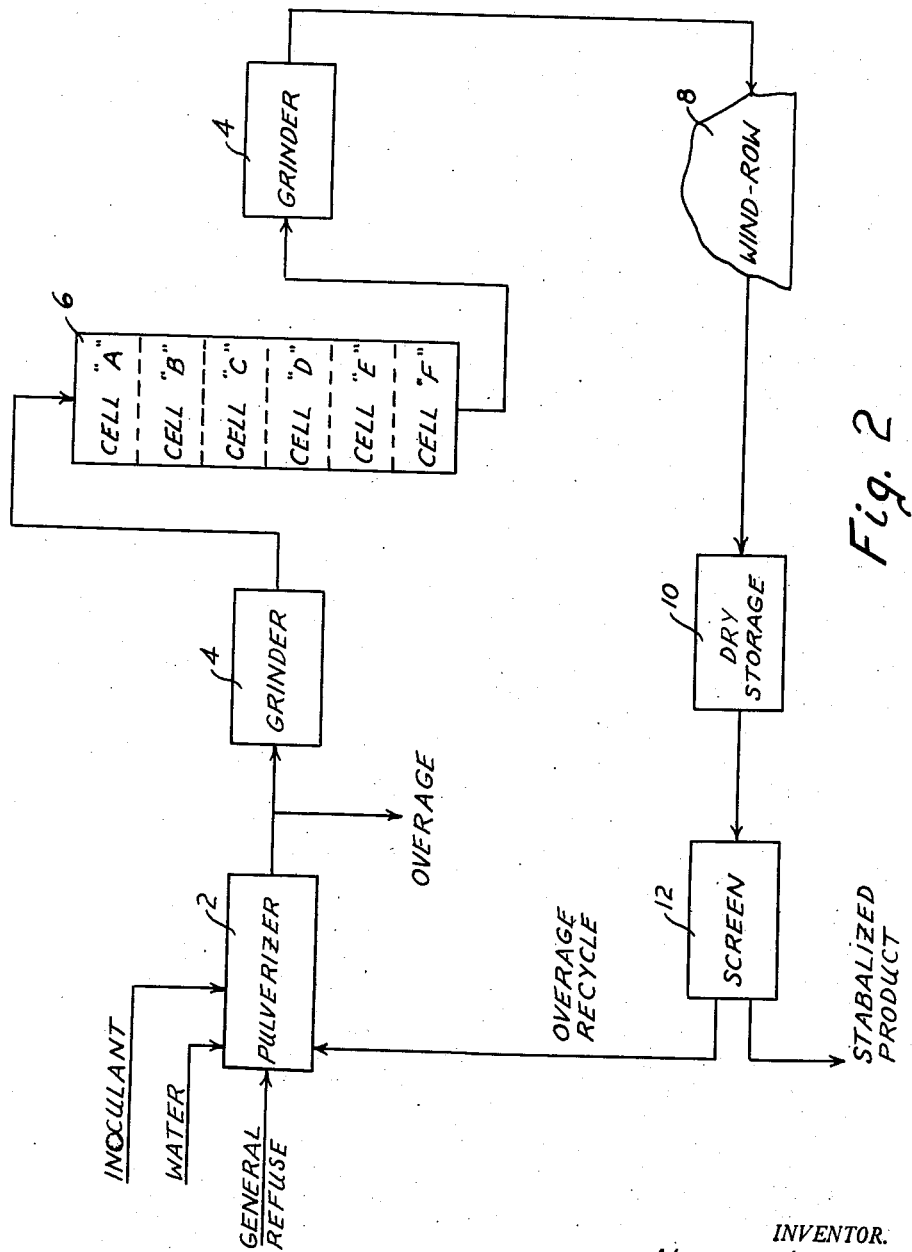
Figure 2 is a schematic flow chart illustrating a preferred embodiment of my invention.

In accordance with this invention, and as shown in Fig. 2, the refuse is introduced into a pulverizer 2 from the usual refuse collection trucks (not shown) to provide an initial reduction in the particle size of the refuse. Any suitable apparatus may be used to provide this initial reduction and mixing. A specific example of a suitable pulverizing apparatus is illustrated in applicant's co-pending application entitled "Pulverizer," Ser. No. 489,131, filed February 18, 1955, now Patent No. 2,797,051. It is preferred that the discharging end of the pulverizer 2 be provided with a screen (not shown) having relatively large openings to provide a separation of extremely large articles from the refuse which cannot be readily composted. Examples of such articles are automobile tires and abandoned ice boxes. Small metal articles, such as tin cans, are preferably left in the refuse for purposes as will be hereinafter set forth.

As the refuse is passing through the pulverizer, water is introduced through suitable sprays or the like to adjust the moisture content of the refuse to between 50 and 70 percent. The addition of moisture undesirably reduces the temperature of the refuse, usually from 7 to 20 degrees F., but the additional moisture appreciably increases subsequent bacterial activity. The weight of the wetted refuse is preferably from 25 to 35 pounds per cu. ft. Also, thermophilic type aerobic bacteria and *A. fumigatus* type fungi are introduced into the refuse as the refuse is being passed through the pulverizer.

I have found that a sufficient quantity of the desired bacteria and fungus is obtained when each ton of refuse is inoculated with 3 ounces of a filler material having a bacterial count of 1,300,000,000 and penetrated with *A. fumigatus* mold to an extent that the material is blue-grey in color, as observed by the naked eye, and particularly when observed through 10 power magnification. As a practical matter, the required bacteria and fungus may be obtained from a steer manure media which had an original moisture content of (or was wetted to have a moisture content of) about 83 percent, and was dried slowly for approximately 3 months to a final moisture content of about 3 percent, and which was penetrated with blue-grey Aspergillus cellulose fungus belonging to the *A. fumigatus* family. The bacterial count of such media will be approximately as noted above. These bacteria and fungi are required only when a portion of the final product is not recirculated into the initial refuse, as will be more fully hereinafter set forth.

The refuse discharging from the pulverizer 2 is preferably of a size to pass through a screen (not shown) having openings 6 inches by 6 inches, principally to facilitate grinding of the refuse in a grinder 4. In fact, if the initial refuse is hand picked to remove the extremely large articles, and if the grinder 4 is capable of accepting the remaining refuse, the pulverizer 2 may be eliminated.

The grinding apparatus 4 is of a suitable type to reduce the particle size of the refuse to where the particles range from about 2 inches down to ⅛ inch, preferably with about an even weight distribution of particles in the range. Such grinding substantially increases the area of the refuse which is exposed to bacterial action during the subsequent digestion cycles to materially decrease the time required for a complete digestion of the refuse. Also, the grinding enhances fungus growth and distributes the fungus and bacteria. However, if the particle size of the refuse is reduced substantially below ¼ to ⅛ inch, the refuse has a tendency to pack or conglomerate, which will inhibit aeration of the material, as well as bacterial action. I have found that a chain type grinder is very efficient to provide a reduction in the particle size of the refuse. Such a grinder also provides a beneficial increase in the temperature of the refuse, particularly when the refuse contains metal articles. With a chain type grinder, the temperature of the refuse is increased from 10 to 20 degrees F., and discharges from the grinder at an average temperature of 78 degrees F.

The ground refuse is then fed into a digestion cell 6 where the entire mass will be constantly exposed to air to facilitate aerobic bacterial action, and anaerobic bacterial action is suppressed, until the temperature of the refuse exceeds the temperature at which the anaerobic bacteria will normally survive. I prefer to use a series of six digestion cells constructed one above the other in vertical stacks, since this facilitates the movement of the refuse from cell-to-cell. Also, when a cell discharges refuse downwardly to an adjacent lower cell, the refuse is turned to provide a further aeration of the refuse and separation of the fungus, whereby the fungus growth spreads more rapidly. I have shown a series of such cells as "A" through "F" in the accompanying drawing. The ground refuse is fed to the upper cell "A" by a suitable conveyer apparatus (not shown), and is retained in cell "A" for a period of approximately 24 hours, during which time the entire mass is aerated to provide only aerobic bacterial action. Furthermore, the refuse is retained motionless during this period to facilitate growth of the fungus to the point where the fungus will multiply when it's disturbed and broken.

The aeration of the mass in the digestion cell 6 may be accomplished by any suitable means, such as a forced air system. However, I prefer to use a cell of such dimensions, and exposed to the atmosphere on at least two sides, to provide a natural circulation of air through the mass. I have found that when the dimension of the cell between two exposed sides is not greater than 28 inches, and the particle size of about 15 percent of the refuse is not less than about 1½ inches, the entire mass will be sufficiently aerated by natural air circulation to inhibit and practically eliminate anaerobic bacterial activity. It will be understood that the remaining two dimensions of the cell may be as great as desired. In such a naturally aerated cell, the temperature of the refuse rises to from 80 to 125 degrees F. during the first 24 hour period, depending upon the ambient air temperature, and since anaerobic bacterial action is suppressed, practically no offensive odors will be released from the cell.

After about 24 hours, the refuse is dumped into the next lower cell, cell "B," in such a manner that the refuse is turned to enhance the aeration of the mass and break-up and distribute the fungus in the mass. The refuse is then retained in cell "B" for approximately 24 hours to provide a further aerobic digestion and fungus growth in the same manner as attained in cell "A." With the preferred type of aerated cell, the temperature of the refuse increases to a temperature between 110 and 148 degrees F. during the second 24 hour period. At the end of this second 24 hour period, the refuse is dumped into the next lower cell, cell "C," and the digestion is repeated for the same length of time and in the same manner as previously described in connection with cells "A" and "B." The movement of the refuse is continued through the successive cells "D," "E" and "F" in the same manner at the end of each 24 hour period. When the refuse is in cell "C" (during the third 24 hour period) the refuse attains a temperature of from 135 to 170 degrees F. The temperature in cell "D" rises to 145 to 166 degrees F.; in cell "E" the temperature levels off to between 150 and 162 degrees F., and in cell "F" the temperature decreases to 145 to 155 degrees F., indicating a decrease in bacterial activity.

It is to be noted that at this point in the process, the refuse has proceeded through the peak digestion temperature which is above the temperature at which anaerobic bacteria normally survive (as well as above the pasteurization temperature) to effectively destroy the anaerobic bacteria contained in the refuse. Only a very minor portion of anaerobic bacteria will then be present, and the refuse has been constantly aerated to effectively inhibit the anaerobic action. Also, of course, the increase in temperature of the refuse above the pasteurization temperature eliminates all pathogens which may have initially existed in the refuse.

At the end of the controlled aerobic digestion, the refuse, that is, the material discharging from the lower cell "F," is fed to another grinder apparatus 4 which may be constructed in the same manner as the previously described grinder. This second grinder 4 further reduces the particle size of the refuse, with the maximum particle size being about 1½ inches, and the majority of the particles being below ⅛ inch. During the conveying of the refuse to the second grinder 4 and during the grinding operation, the temperature of the refuse will decrease from average of about 150 degrees F. to about 110 degrees F., and the weight of the refuse at this point in the process has usually increased to from 36 to 44 pounds per cu. ft. It should also be noted that the refuse discharging from the controlled digestion has a sweet odor, is brownish in color and is thoroughly penetrated with white, pink and yellow mold growths resulting from the original fungi inoculation.

The material discharging from the second grinder is conveyed to any desired location and piled in stacks or wind-rows 8 of any convenient size. As previously indicated, these stacks or wind-rows may be conveniently formed in an exposed area, and need not be protected from changing temperature conditions, or rain, snow or the like. As the refuse is stacked, air is trapped in the interior of the stacks to facilitate further aerobic bacterial action, and as previously noted, the great majority of the putrifying (anaerobic) bacteria have been eliminated previously.

Although the desired results are usually accomplished in about 6 days, I prefer to leave the refuse in the wind-rows 8 for a period of about 12 days. During this time, the temperature in the wind-rows increases and then decreases as the bacterial action increases and decreases in a manner similar to the temperature cycle attained through the controlled aerobic digestive portion of the process. During the first 24 hours the refuse is stacked in the wind-rows 8, the temperature rises from about 110 to between 140 and 160 degrees F. During the second 24 hours, the temperature rises on up to between 150 and 166 degrees F. During the third day the refuse is characterized by the existence of a dense growth of white mold or fungi about two inches under the surface of the stack or wind-row. This mold starts penetrating to the center of the stack during the third day, and the temperature gradually decreases. At the end of twelve days (and usually by the end of 6 days) the temperature is down to about 120 to 140 degrees F., and the material can at this time be used as a soil nutrient. However, I prefer not to use the material until the temperature decreases to below 120 degrees F., since the bacteria remaining in the material at this temperature are substantially inactive and cannot easily be regenerated. When the temperature of the material has decreased to about 120 degrees F., the material is characterized by being grey-blue in color and having a mold throughout the entire stack.

If it is desired to distribute the product to the general public, and particularly when it is desired to package the product for retail, small unit volume sales, the material should be moved from the wind-rows 8 to a storage warehouse or the like 10. A suitable storage house may be constructed with a closed top and louvered sides to provide circulation of air through the material and a decrease of the moisture content of the material. It is preferred that the moisture content be decreased to 20 percent or below, since I have found that at that moisture content the product may be bagged and the bacteria will not again become active while the material is in the bags. The time of storage of the material in the dry storage facilities 10 will depend upon the moisture content, which in turn will depend upon climatic conditions while the material was stacked in the wind-rows.

As an alternative to stacking the material in wind-rows after leaving the second grinder 4, the material may be moved directly to any suitable storage shed. In this event, the mold will penetrate the material first, and then the material will dry out to the desired moisture content. I have found that the mold will usually completely penetrate the material in about 6 days, and then the material begins to dry out.

When the moisture content of the material is down to 20 percent or below, the material is conveyed to a suitable screening apparatus 12 for the removal of material which has not been composted, such as tin cans and other metals. And, of course, several grades of screens may be provided if different particle sizes are desired for different retail outlets. It should also be noted that any glass which was in the original refuse will, during the various grinding operations, be reduced to such a size that it cannot be observed in the finished product by the naked eye.

The overage from the screening apparatus 12, usually consisting of tin cans and other metals and a small portion of the finished compost, is recycled and introduced into the initial refuse prior to the controlled aerobic digestive portion of the cycle, and preferably into the pulverizer 2. It is preferred that about 3 percent of the composted material be recycled as overage. This recycled material will contain sufficient *A. fumigatus* type mold or fungi, and sufficient thermophilic, aerobic bacteria to inoculate the next quantity of initial refuse.

As previously indicated, a great variety of materials may be composted by the present process. For example, sewage sludge may be added to refuse in the pulverizer 2, with the sludge content varying from 0 to 50 percent by weight, based on the total weight of material being composted, and the resulting product will be quite suitable as a soil nutrient. The temperature attained by the present process effectively eliminates all harmful bacteria which may be present in the sludge.

As a specific example of the present invention, I have decomposed and stabilized several days of refuse from a typical municipal refuse collection system, with the refuse containing both organic and inorganic matter, such as table-scraps, limbs, paper, tin cans and glass bottles and having an average moisture content of 23 percent by weight. The refuse was initially reduced in size to particles less than 6 inches by 6 inches by a pulverizer in batches of approximately 1,880 pounds each. The average carbon/nitrogen ratio of the initial refuse was 60/1.

Simultaneous with this initial reduction in particle size, each batch of refuse was sprayed with water to attain an average moisture content of 54.46 percent, and the first batch of refuse was inoculated with thermophilic bacteria and *A. fumigatus* fungus in the amounts previously described.

The inoculated and moistened refuse was then ground by a chain type grinder until the particle size of the refuse averaged as follows: 12 percent by weight above 2 inches in diameter; 4 percent by weight between 1 and 2 inches in diameter; 8 percent by weight between ½ and 1 inch in diameter; 5.7 percent by weight between ¼ and ½ inch in diameter, and the remaining 70 percent by weight having a diameter below ¼ inch, with only a minor portion having a diameter less than ⅛ inch. The average temperature of the refuse leaving the grinder was 67 degrees F.

The ground refuse was then subjected to aerobic bacterial digestion and fungus growth for 24 hours in a cell 28 inches wide, with no movement of the refuse for the 24 hour period. Each side of the cell was covered by a screen to expose the refuse to natural aeration—no forced aeration was employed. The mass of refuse was then dumped or poured down into a similarly constructed cell, with the mass being turned by the dumping action, and then the bacterial digestion and fungus growth was repeated for another period of 24 hours. This procedure was repeated until the mass had proceded through six of these cells. No obnoxious odors were perceived during the entire time the refuse remained in the cells. During this portion of the decomposition process, the average temperature of the mass varied as follows:

End of first day 82 degrees F.
End of second day 118 degrees F.
End of third day 158 degrees F.
End of fourth day 154 degrees F.
End of fifth day 137 degrees F.
End of sixth day 119 degrees F.

The partially composted mass leaving the last digestion cell was again passed through a chain type grinder and the average particle size of the material leaving the grinder was as follows: 3 percent by weight above 2 inches in diameter; 2 percent by weight between 1 and 2 inches in diameter, 3 percent by weight between ½ and 1 inch in diameter; 4 percent by weight between ¼ and ½ inch in diameter, and the remaining 88 percent below ¼ inch in diameter. The average temperature of the mass leaving this grinder was 119 degrees F.

Next, the mass was stacked in an open area in stacks about 10 feet by 5 feet wide and 6 feet high. The stacks were left undisturbed for a period of 6 days. During the third day, a dense growth of white mold was observed about 2 inches inside each stack, and the average temperature of the mass rose from 119 degrees F. to a maximum of 154 degrees F. at the end of 1½ days and then slowly cooled to a temperature of about 91 degrees F. at the end of 6 days. At this time, the composted mass was characterized by a dense growth of white mold throughout the stack, and the average moisture content of the mass was 44.54 percent.

The material was then moved from the stacks to a dry, well ventilated building and retained there for a period of 21 days. At the end of this period, the average moisture content was 26 percent, and the material was passed through a screening apparatus to remove all particles above ¼ inch in diameter.

The overage (consisting of about 3 percent by weight of the entire product) from the screening operation, which included tin cans, other small pieces of metal, plastic and some of the composted product, was introduced into a subsequent batch of refuse in the pulverizer. With the use of this overage, no additional bacteria or fungus was required for the new batch of refuse passing through the pulverizer.

As previously noted, I prefer to subject the refuse, or other material being decomposed, to controlled aerobic digestion in the aerated cells for a period of about 6 days, even though the temperature of the composting mass ordinarily reaches its peak in substantially less than 6 days. The reason for this procedure is simply to assure that the material reaches its peak temperature and substantially all of the anaerobic bacteria are killed. Probably the largest factor controlling the time in which the peak temperature is reached, is the nitrogen content (determined by the carbon/nitrogen ratio) of the material. The higher the nitrogen content, the faster the material ordinarily reaches its peak temperature. In the specific example previously described (the temperature curve of which is shown in Fig. 1, the carbon/nitrogen ratio was about 60/1 and the peak temperature was attained in 3 days. Some materials have a lower nitrogen content and a greater time is required, however, the peak should be reached in 6 days. On the other hand, and perhaps fortunately, sewage sludge increases the nitrogen content and speeds up the peak temperature, thereby quickly eliminating the putrifying bacteria in the sludge.

Another factor in the time at which the peak temperature is reached, is the ambient outside air temperature. When the air temperature decreases substantially during the controlled digestion, the peak temperature may be reached later than ordinary.

From the foregoing it is apparent that the invention provides an economical process of decomposing and stabilizing a great variety of waste materials, with particular reference to the general refuse collected by a municipal refuse collection system. A minimum of manpower is required to practice the invention, and substantially no obnoxious odors will be generated during the process. No expensive machinery, such as scrapers or conveyers for constantly moving the refuse, is required, and a material may be decomposed into a desirable soil nutrient in a minimum of time.

Changes may be made in the combination and arrangement of steps set forth in the specification and shown in the drawings without departing from the spirit and scope of the invention as defined in the following claims.

I claim:

1. A method of decomposing, to a soil nutrient, municipal refuse having a moisture content of from about 18 to 25 percent, comprising the steps of:

(a) adding water to adjust the moisture content of said refuse to between 50 and 70 percent, (b) inoculating each ton of said refuse with at least 3 ounces of a filler material having an aerobic themophilic bacterial count of at least 1,300,000,000 and penetrated with *A. fumigatus* mold to an extent that said filler material is blue-grey in color, (c) grinding the refuse to particles ranging in size between 2 inches and ⅛ inch, with not more than about 15 percent of the particles being below 1½ inches in size, (d) feeding the ground refuse to the uppermost of a series of vertically superimposed digestion cells, said refuse being supported in said uppermost cell at a depth of not more than about 28 inches, (e) exposing each side of each of said cells to natural air circulation for inducing aerobic bacterial action and mold growth in said refuse, (f) successively moving said refuse downwardly to the next lower cell of said series each 24 hours while turning and breaking-up the partially composted refuse each time the refuse is moved downwardly, (g) retaining said refuse in said series of cells until the temperature of said refuse exceeds the temperature of pasteurization, then (h) regrinding the partially decomposed refuse to a smaller particle size than the particle size thereof at the end of the initial grinding step to expose untreated portions of said refuse, then (i) allowing further bacterial action in said refuse until the temperature again exceeds the temperature of pasteurization and said refuse is decomposed to a soil nutrient.

2. A method as defined in claim 1 wherein said refuse is retained in said series of cells for about six days.

3. A method as defined in claim 1 wherein said reground and partially decomposed refuse is stacked in windrows for said further bacterial action.

4. A method as defined in claim 3 wherein said windrows are left undisturbed for at least six days.

References Cited in the file of this patent

UNITED STATES PATENTS

| | | |
|---|---|---|
| 2,043,265 | Roeder | June 9, 1936 |
| 2,209,613 | Roeder | July 30, 1940 |
| 2,285,834 | Proctor | June 9, 1942 |
| 2,734,803 | Ruskin | Feb. 14, 1956 |
| 2,798,800 | Geraghty et al. | July 9, 1957 |
| 2,820,703 | Dresser et al. | Jan. 21, 1958 |

FOREIGN PATENTS

| | | |
|---|---|---|
| 521,894 | Great Britain | June 4, 1940 |